United States Patent [19]
Rock et al.

[11] Patent Number: 5,783,277
[45] Date of Patent: Jul. 21, 1998

[54] THREE-DIMENSIONAL KNIT SPACER FABRIC FOR FOOTWEAR AND OUTERWEAR

[75] Inventors: Moshe Rock, Andover, Mass.; Karl Lohmueller, Hampstead, N.H.; Douglas Lumb, Metheun, Mass.

[73] Assignee: Malden Mills Industries, Inc., Lawrence, Mass.

[21] Appl. No.: 839,296

[22] Filed: Apr. 17, 1997

[51] Int. Cl.⁶ .............................. B32B 5/26; B32B 33/00; A41D 27/06; A41D 27/28

[52] U.S. Cl. .................. 428/86; 2/258; 428/91; 428/95; 428/96; 442/118; 442/318; 36/1

[58] Field of Search ........................ 428/86, 91, 95, 428/96; 442/318, 118; 2/258

[56] References Cited

U.S. PATENT DOCUMENTS

| | | |
|---|---|---|
| 5,312,667 | 5/1994 | Lumb et al. |
| 5,344,698 | 9/1994 | Rock et al. |
| 5,385,036 | 1/1995 | Spillane et al. |
| 5,413,837 | 5/1995 | Rock et al. |
| 5,514,428 | 5/1996 | Kunert |
| 5,547,733 | 8/1996 | Rock et al. |

FOREIGN PATENT DOCUMENTS

| | | |
|---|---|---|
| 0692563 | 7/1996 | European Pat. Off. |
| WO9516416 | 6/1995 | WIPO |

*Primary Examiner*—James C. Cannon
*Attorney, Agent, or Firm*—Gottlieb, Rackman & Reisman, P.C.

[57] ABSTRACT

An integrated three-dimensional knit spacer fabric is provided. The fabric includes identical first and second fabric layers, and a yarn interconnecting the two layers. Both the layers of the fabric have their surfaces napped.

11 Claims, 1 Drawing Sheet

THREE-DIMENSIONAL KNIT SPACER FABRIC FOR FOOTWEAR AND OUTERWEAR

BACKGROUND OF THE INVENTION

This invention relates to a three-dimensional knit or woven fabric, and more particularly, to a three-dimensional knit or woven fabric having first and second fabric layers spaced from and connected to each other.

Prior art fabric designs for footwear and outerwear often include some type of stiffener material between two fabric layers in order to ensure shape retention of the fabric. This design is less than satisfactory since it is not integrated which limits design capabilities while incurring high assembly costs.

Accordingly, it is desirable to provide a fabric which overcomes the above disadvantages.

SUMMARY OF THE INVENTION

Generally speaking, in accordance with the invention, an integrated composite three-dimensional knit spacer fabric is provided. The fabric includes identical first and second fabric layers, and a resilient yarn interconnecting the two layers. Both the layers of the fabric have their surfaces napped.

The three-dimensional spacer fabric of the invention may be used for footwear and outerwear. In all uses, the fabric is constructed such that the bulk ratio of the stitch and pile yarns is controlled.

It is significant that the knit fabric of the invention has a three-dimensional structure. Because of this construction, it is inherently rigid and therefore maintains its shape.

Accordingly, it is an object of the invention to provide an improved knit fabric construction for enhanced shape retention.

Another object of the invention is to provide an improved three-dimensional fabric which is sufficiently resilient.

Another object of the invention is to provide a three-dimensional fabric which functions as a spacer fabric.

Still other objects and advantages of the invention will in part be obvious, and will in part be apparent from the following description.

The invention accordingly comprises the construction having the features, properties and relation of components, as exemplified in the following detailed disclosure, and the scope of the invention will be indicated in the claims.

BRIEF DESCRIPTION OF THE DRAWINGS

For a fuller understanding of the invention, reference is made to the following description, taken in connection with the attached drawings, in which.

DETAILED DESCRIPTION OF THE PREFERRED EMBODIMENT

Figure 1:
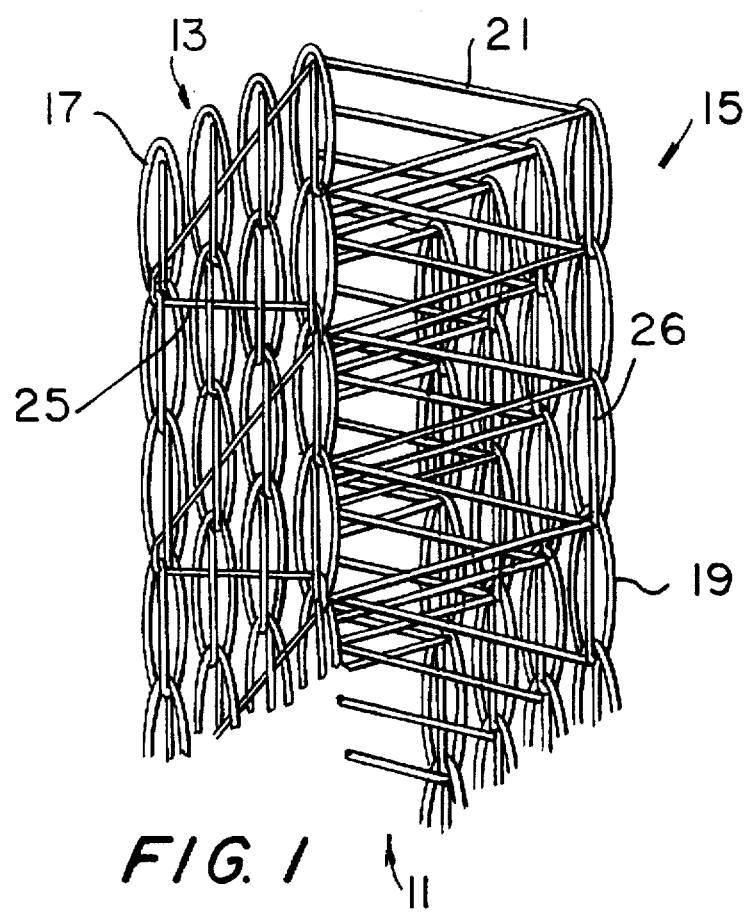
FIG. 1 is a side elevational view showing the loop structure of the spacer fabric made in accordance with the invention.
Figure 2:
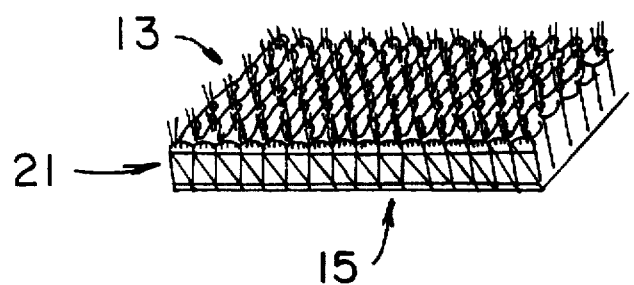
FIG. 2 is a side view of the inventive spacer fabric showing the nap face of the top fabric layer.

The double-face fabric of the invention is prepared by knitting a three-dimensional knit fabric on a double-needle bar warp knitting machine commonly used in the manufacture of velvet and well known in the art. As shown in FIGS. 1 and 2, the three-dimensional knit spacer fabric is generally indicated at 11 and includes a first fabric layer 13 made from stitch yarn 17, a second fabric layer 15 made from stitch yarn 19, and pile yarn 21 interconnecting the two layers. In addition, knit fabric 11 includes backing or lay-in yarns 25 and 26 which are held by stitch yarns 17 and 19 respectively as shown.

In preparing the three-dimensional knit fabric of the invention, the yarn that is used is preferably a synthetic material such as polyester, acrylic or nylon. The yarn may be filament or spun, textured or fully oriented.

The yarn interconnecting the two layers of the inventive three-dimensional knit spacer fabric should have sufficient resilience and stiffness to keep the two fabric layers apart even if pressure is applied to any one of the fabric layers. In construction, pile yarn 21 of the inventive fabric is knit with between 16 and 28 wales and 14–36 courses per inch. This density enhances shape retention of the fabric.

In construction, the interconnecting pile yarn may be made of either the same or different material than that of the two fabric layers. Particularly, in order to render the interconnecting pile yarn resilient, the yarn may be made of a resilient material such as monofilament or multifilament polyester, nylon, etc.

Top layer 13 and bottom layer 15 are identical. Both are made from hydrophilic fibers to make sure that all moisture is transported through it, thus keeping all surfaces dry.

Each of layers 13 and 15 is made from a stitch yarn having a fineness of between 70 and 150 denier with an individual fiber fineness in the range of between 1 and 6 dpf if multifilament. Backing or lay-in yarns 25 and 26 of top layer 13 will be multifilament and will have a fineness of between 100 and 200 denier, with an individual fiber fineness of 1.0 to 5.0 dpf.

Stitch yarns 17 and 19 and backing yarns 25 and 26 are made from polyester or nylon that may be rendered hydrophilic in order to enhance the transport of perspiration or water. Particularly, each layer may be chemically treated or utilize modified fibers so that it is rendered hydrophilic, as described in U.S. Pat. No. 5,312,667 which is hereby incorporated by reference.

By using a chemically modified fiber or by chemically treating each layer, the layer is rendered substantially hydrophilic. As a result, the transport of water from the surface, especially since the yarn fibers are raised, as described hereinbelow, is substantially enhanced—liquid moisture is made readily transportable along the surface of the yarn fibers of the layer.

Pile yarn 21 which interconnects the two layers is made from polyester, nylon or polypropylene and may be a monofilament or multifilament yarn having a fineness of between 300 and 600 denier, with an individual fiber fineness of 1.0 to 5.0 dpf.

The surface of fabric layers 13 and 15 may be sanded, brushed or napped, thus comprising a double sided pile or velour fabric. In accordance with the invention, the yarn which is coarser is napped—either the stitch yarn of the layer or the interconnecting pile yarn. Significantly, the yarn which is napped must be multifilament.

Optionally, the fabric of the invention may incorporate an elastomeric yarn such as LYCRA in one or both of lay-in yarns 25 and 26 of layers 13 and 15 respectively. Such yarn will have a total fineness of between about 70 and 200 denier of wrap LYCRA. This will enhance the softness and flexibility of the layer and tightness of fit. The elastomeric yarn may also be added to the stitch yarn of each layer.

It will thus be seen that the objects set forth above, and those made apparent from the preceding description, are efficiently attained, and since certain changes may be made in the constructions described above without departing from the spirit and scope of the invention, it is intended that all matter contained in this description shall be interpreted as illustrative and not in a limiting sense.

It is also to be understood that the following claims are intended to cover all of the generic and specific features of the invention herein described, and all statements of the scope of the invention which come as a matter of language, might be said to fall therebetween.

We claim:

1. A three-dimensional knit spacer fabric comprising:
   a first fabric layer made from a first stitch yarn and a backing yarn, a second fabric layer made from a second stitch yarn and a backing yarn, and a pile yarn interconnecting said first and second layers;
   wherein each of said layers is identical to the other such that either said stitch yarn of each said layers or said pile yarn adjacent said layers is raised.

2. The fabric of claim 1, wherein said pile yarn is knit with between about 16 and 28 wales per inch and about 14 and 36 courses per inch.

3. The fabric of claim 1, wherein the yarns of both the top and bottom layers are made from hydrophilic fibers.

4. The fabric of claim 1, wherein the stitch yarn of each of the first and second layers has a fineness of between about 70 and 150 denier.

5. The fabric of claim 1, wherein the backing yarn of each of said top and bottom layers has a fineness of between about 100 and 200 denier.

6. The fabric of claim 1, wherein one of said stitch or pile yarns is raised by one of brushing, sanding or napping.

7. The fabric of claim 1, wherein said pile yarn has a fineness of between about 300 and 600 denier.

8. The fabric of claim 1, where each of said stitch yarns of said layers is raised and said pile yarn is monofilament.

9. The fabric of claim 1, wherein said yarn that is raised is multifilament.

10. The fabric of claim 1, wherein said stitch yarn of said layers is raised if coarser than said pile yarn.

11. The fabric of claim 1, wherein said pile yarn is raised if it is coarser than the stitch yarns of the fabric layers.

* * * * *